United States Patent
Kang

(10) Patent No.: US 11,384,983 B2
(45) Date of Patent: Jul. 12, 2022

(54) GLASS HEATING FURNACE

(71) Applicant: TUNG CHANG MACHINERY AND ENGINEERING CO., LTD., Taoyuan (TW)

(72) Inventor: Chung-Hsieh Kang, Taoyuan (TW)

(73) Assignee: TUNG CHANG MACHINERY AND ENGINEERING CO., LTD., Taoyuan (TW)

( * ) Notice: Subject to any disclaimer, the term of this patent is extended or adjusted under 35 U.S.C. 154(b) by 79 days.

(21) Appl. No.: 16/735,176

(22) Filed: Jan. 6, 2020

(65) Prior Publication Data

US 2020/0141650 A1    May 7, 2020

Related U.S. Application Data

(63) Continuation-in-part of application No. 15/291,207, filed on Oct. 12, 2016, now abandoned.

(51) Int. Cl.
*C03B 35/16* (2006.01)
*F27B 9/36* (2006.01)

(52) U.S. Cl.
CPC .............. *F27B 9/36* (2013.01); *C03B 35/16* (2013.01); *C03B 35/163* (2013.01);
(Continued)

(58) Field of Classification Search
CPC ..... C03B 29/08; C03B 2225/00; C03B 25/08; C03B 35/163
See application file for complete search history.

(56) References Cited

U.S. PATENT DOCUMENTS 1,931,628 A * 10/1933 Von Reis ................ C03B 35/16
                                                            65/254
3,650,375 A *  3/1972 Fleischauer .......... B65G 47/263
                                                            198/790
(Continued)

FOREIGN PATENT DOCUMENTS

CN       203440234 U    2/2014
CN       203700171 U    7/2014
(Continued)

OTHER PUBLICATIONS

1st office action for corresponding TW Appln.105130080 dated Jan. 16, 2017, 5 pages.
1st office action for GB1617545.7 dated Apr. 21, 2017, 6 pages.

*Primary Examiner* — Cynthia Szewczyk
(74) *Attorney, Agent, or Firm* — Demian K. Jackson; Jackson IPG PLLC

(57) ABSTRACT

A glass heating furnace is illustrated. Rollers of the glass heating furnace are pivotally connected to a movable frame, and a roller driver of the glass heating furnace controls the rollers to rotate to a direction of an X axis, and a movable frame driver controls the movable frame to displace reciprocatively along a Y axis, such that the rollers displace along the Y axis at the same time. The glass displaces reciprocatively in multiple directions to be heated up more uniformly, which effectively reduces formation of the thermal stress marks on the glass. Since the rollers displace along the Y axis at the same time, the glass on the rollers does not have the displacement of the Y axis in respect to the rollers, such that friction of the displacement of the glass is reduced, which more effectively reduces formation of the thermal stress marks on the glass.

12 Claims, 14 Drawing Sheets

(52) U.S. Cl.
CPC ... *C03B 2225/00* (2013.01); *F27B 2009/3607* (2013.01); *F27B 2009/3623* (2013.01)

(56) References Cited

U.S. PATENT DOCUMENTS

| | | | | |
|---|---|---|---|---|
| 3,867,748 | A * | 2/1975 | Miller | C03B 35/186 432/246 |
| 4,300,937 | A * | 11/1981 | Rhonehouse | C03B 27/044 65/351 |
| 4,773,925 | A * | 9/1988 | Schultz | C03B 23/0254 65/104 |
| 4,816,055 | A | 3/1989 | Reunamaki et al. | |
| 5,009,693 | A * | 4/1991 | Freidel | C03B 23/025 65/104 |
| 5,188,651 | A * | 2/1993 | Csehi | C03B 29/08 65/114 |
| 5,226,942 | A * | 7/1993 | Letemps | C03B 23/03 65/106 |
| 5,246,477 | A * | 9/1993 | Kramer | C03B 23/0254 65/107 |
| 6,397,634 | B1 * | 6/2002 | Takeda | C03B 23/0254 65/102 |
| 6,470,711 | B1 * | 10/2002 | Jarvinen | C03B 29/08 219/470 |
| 7,712,334 | B2 * | 5/2010 | Kanno | C03B 35/186 65/29.11 |
| 9,079,791 | B2 * | 7/2015 | Nitschke | C03B 23/03 |
| 2004/0007020 | A1 * | 1/2004 | Kanno | C03B 35/186 700/59 |

FOREIGN PATENT DOCUMENTS

| | | |
|---|---|---|
| CN | 104418490 A | 3/2015 |
| CN | 204999798 U | 1/2016 |
| EP | 0176768 A1 | 4/1986 |
| WO | 9744282 A1 | 11/1997 |
| WO | 2005121036 A1 | 12/2005 |

* cited by examiner

GLASS HEATING FURNACE

CROSS REFERENCE

This non-provisional application is a continuation-in-part of application which claims priority to the pending non-provisional application for patent Ser. No. 15/291,207, filed Oct. 12, 2016.

BACKGROUND

1. Technical Field

The present disclosure relates to a glass heating furnace, and more particularly to a glass heating furnace allowing the glass to be heated up more uniformly, thereby reducing effectively the thermal stress marks which are formed on the glass.

2. Description of Related Art

Glass is equipped with the excellent permeability and is scratch-proofed. Therefore, glass is widely used in a daily life, such as buildings and general articles for daily use. Furthermore, even in electronic products or vehicles, there are related glass products. Accordingly, it is apparently that the glass-related merchandises have already been everywhere in the people's life.

Glass is mostly made by the procedure of dosing, melting, forming and annealing. After making glass, glass can be also processed by an automatic apparatus such as a glass heating furnace. Glass is heated up by the glass heating furnace to improve the strength.

Referring to FIG. 1 and FIG. 2, a conventional glass heating furnace includes a chamber which is provided with plural upper heating elements 1 and lower heating elements 2 aligned symmetrically at an upper and lower position. In addition, plural rollers 3 are disposed between the upper heating elements 1 and the lower heating elements 2 to carry glass A. The glass A stays in the chamber for a fixed time at a fixed position and is heated up by the thermal radiation from the upper heating elements 1 and the lower heating elements 2. After being heated up for the fixed time at the fixed position, the glass A is driven by a roller driver 50 to be transmitted out of the chamber, and is then cooled down rapidly, thereby improving the strength. However, when the glass A receives the thermal radiation, the molecules in the glass will displace microscopically to be realigned and stacked with one another. Hence, if the glass A does not move at that fixed position, a part in the glass A directly below the upper heating elements 1 and directly above the lower heating elements 2 will be irradiated by the upper heating elements 1 and the lower heating elements 2 directly, resulting in a higher temperature at that part. This enables the glass molecules at that part to displace more easily and to be realigned and stacked with one another more tightly. On the other hand, for other area on the glass A which is not irradiated by the upper heating elements 1 and the lower heating elements 2 directly, such as the area that is not directly below the upper heating elements 1 and not directly above the lower heating elements 2, the temperature is lower in comparison with the part that is irradiated by the upper heating elements 1 and the lower heating elements 2 directly. This allows the glass molecules at that area to displace less easily and to be less easily realigned and stacked with one another, so that the molecules will be stacked less tightly comparing to the part that is irradiated by the upper heating elements 1 and the lower heating elements 2 directly. As the molecules are stacked more tightly at that part, the density in that part is higher; whereas, as the molecules are stacked less tightly at that area, the density in that area is lower. Therefore, the thermal stress marks will be formed by the heating due to the difference in density in the abovementioned two portions, and the refractive index will be different due to the difference in density. In addition, when light passes through the glass, the thermal stress marks in the glass can be identified visually due to the angle of refraction, thereby affecting the quality of uniformity for a same piece of glass.

SUMMARY

Accordingly, the primary object of the present disclosure is to provide a glass heating furnace that allows the glass to be heated up more uniformly, thereby reducing effectively the thermal stress marks which are formed on the glass. In the present disclosure, a roller driver is used primarily to control the rollers to rotate to a direction of an X axis and displace reciprocatively in a direction of a Y axis, so that the glass can be heated up uniformly through the reciprocative displacement of the rollers, thereby reducing significantly the formation of the thermal stress marks in the heating process of the glass.

The present disclosure provides a glass heating furnace comprising: a furnace body, an interior of which is formed with a chamber; a plurality of upper heating elements, which are disposed in the chamber, with the center of one upper heating element being separated with the center of a neighboring upper heating element by a first distance; a plurality of lower heating elements, which are disposed in the chamber and are located oppositely below the upper heating elements, with the center of one lower heating element being separated with the center of a neighboring lower heating element by a second distance; a plurality of rollers, which are disposed in the chamber along a transversal axis and separated with each other, and are located between the upper heating elements and the lower heating elements, with the transversal axis being perpendicular to a longitudinal axis and that longitudinal axis being parallel to the axis of the rollers; a roller driver, being disposed outside the furnace body and connected to the rollers, and used to control the rollers to rotate; a movable frame, being slidably connected to a rack of the furnace body, and the rollers are pivotally connected to the movable frame; and a movable frame driver, being disposed on the furnace body, the movable frame driver controls the movable frame to displace reciprocatively along the longitudinal axis, and the rollers are driven to simultaneously displace reciprocatively along the longitudinal axis, wherein displacements of the rollers along the longitudinal axis are identical to each other.

According to the above features, the glass heating furnace further comprises: a slide rail assembly, comprising a slide block and a slide rail, such that the movable frame is slidably connected to a lower part of the rack and disposed on the rack.

According to the above features, the roller driver controls the rollers to rotate to make the glass displace along the transversal axis reciprocatively, and the movable frame driver controls the slide rail assembly to drive the movable frame to displace reciprocatively along the longitudinal axis, such that the rollers connected to the movable frame are driven to displace reciprocatively along the longitudinal axis, and the glass conveyed by the rollers can displace reciprocatively along the longitudinal axis. Therefore, the reciprocative displacement can be adjusted and modified to increase an area of the glass which is heated up uniformly.

According to the above features, the movable frame displaces reciprocatively along the longitudinal axis between two positions, and a distance between the two positions is at least one fourth of the first distance or at least one fourth of the second distance.

According to the above features, the movable frame displaces reciprocatively along the longitudinal axis between two positions, and a distance between the two positions is at least one third of the first distance or at least one third of the second distance.

According to the above features, the movable frame displaces reciprocatively along the longitudinal axis between two positions, and a distance between the two positions is at least one half of the first distance or at least one third of the second distance.

According to the above features, the movable frame displaces reciprocatively along the longitudinal axis between two positions, and a distance between the two positions is not smaller than the first distance or not smaller than the second distance.

According to the above features, the roller driver comprises a first motor, a driving wheel, a transmission wheel, a plurality of driven wheels, a plurality of elastic wheels, an axial rod and a plurality of transmission belts, wherein the first motor is capable of rotating clockwise and counterclockwise, and is connected to the driving wheel, the transmission wheel and one of the transmission belts are connected to the driving wheel, each of the driven wheels is connected to an end of the axis of the corresponding one of the rollers, the transmission wheel and the elastic wheels are pivotally penetrated by and connected to the axial rod, and the driven wheels are respectively connected to the elastic wheels via the other transmission belts.

According to the above features, the movable frame driver comprises a second motor, a decelerator and a threaded rod assembly, wherein the second motor is capable of rotating clockwise and counterclockwise, the decelerator is capable of reducing a rotating speed and increases a torque, the threaded rod assembly are connected to the movable frame and the decelerator, and the decelerator is connected to the second motor, thereby the movable frame driver drives the movable frame displaces along the longitudinal axis.

According to the above features, the threaded rod assembly comprises a threaded rod and a threaded block, the threaded rod and the threaded block are gnawed with each other, and an axis of the threaded rod is parallel to the longitudinal axis.

According to the above features, the threaded rod is fixed with the movable frame.

According to the above features, the threaded block is fixed with the movable frame.

According to the above features, the rollers are parallel or perpendicular to the upper heating elements or the lower heating elements.

According to the above features, the rollers are perpendicular to the upper heating elements and the lower heating elements.

According to the above features, a moving path of a glass in the chamber in respect to the upper and lower heating elements is like an English letter of S.

According to the above features, the rack does not displace, and the movable frame displaces along the longitudinal axis in respect to the rack.

To sum up, in the present disclosure, not only the roller driver is used to control rollers to rotate to make the glass displace along the transversal axis reciprocatively, but also the movable frame driver used to control the slide rail assembly to drive the movable frame to displace reciprocatively along the longitudinal axis, such that the rollers connected to the movable frame are driven to displace reciprocatively along the longitudinal axis, and the glass conveyed by the rollers can displace reciprocatively along the longitudinal axis. Therefore, the reciprocative displacement can be adjusted and modified to increase an area of the glass which is heated up uniformly.

To enable a further understanding of the said objectives and the technological methods of the disclosure herein, the brief description of the drawings below is followed by the detailed description of the preferred embodiments.

BRIEF DESCRIPTION OF THE DRAWINGS

The accompanying drawings are included to provide a further understanding of the present disclosure, and are incorporated in and constitute a part of this specification. The drawings illustrate exemplary embodiments of the present disclosure and, together with the description, serve to explain the principles of the present disclosure.

DESCRIPTION OF THE EXEMPLARY EMBODIMENTS

Figure 1:
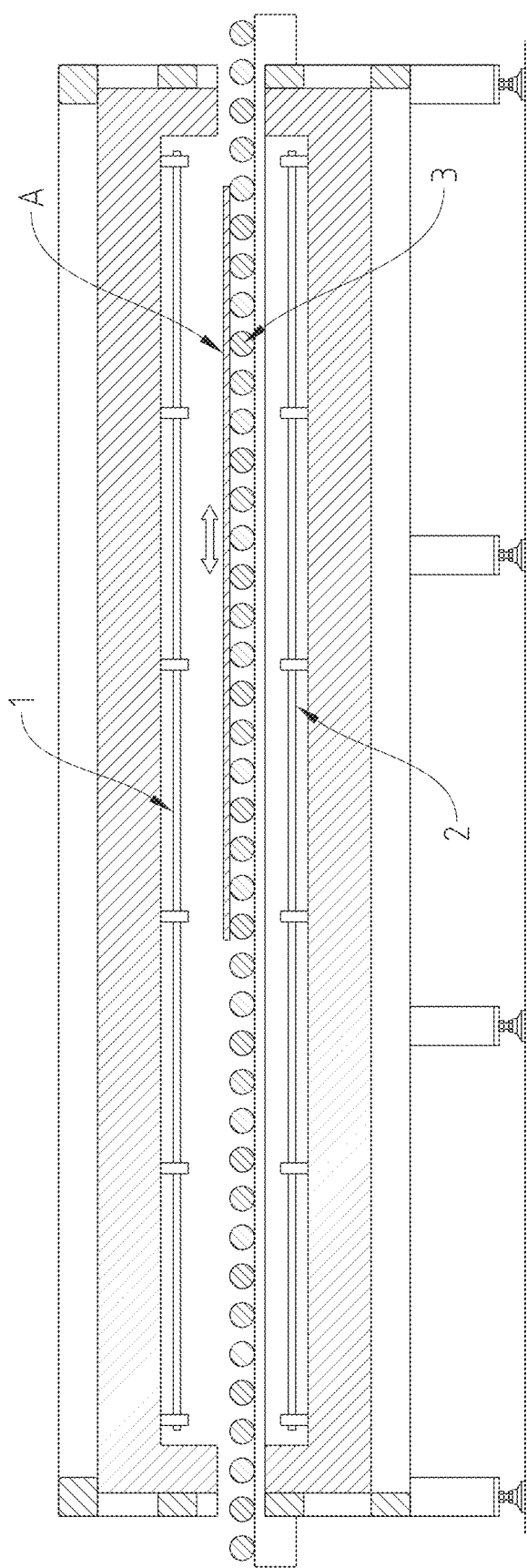
FIG. 1 shows a first schematic view of a conventional glass heating furnace.
Figure 2:
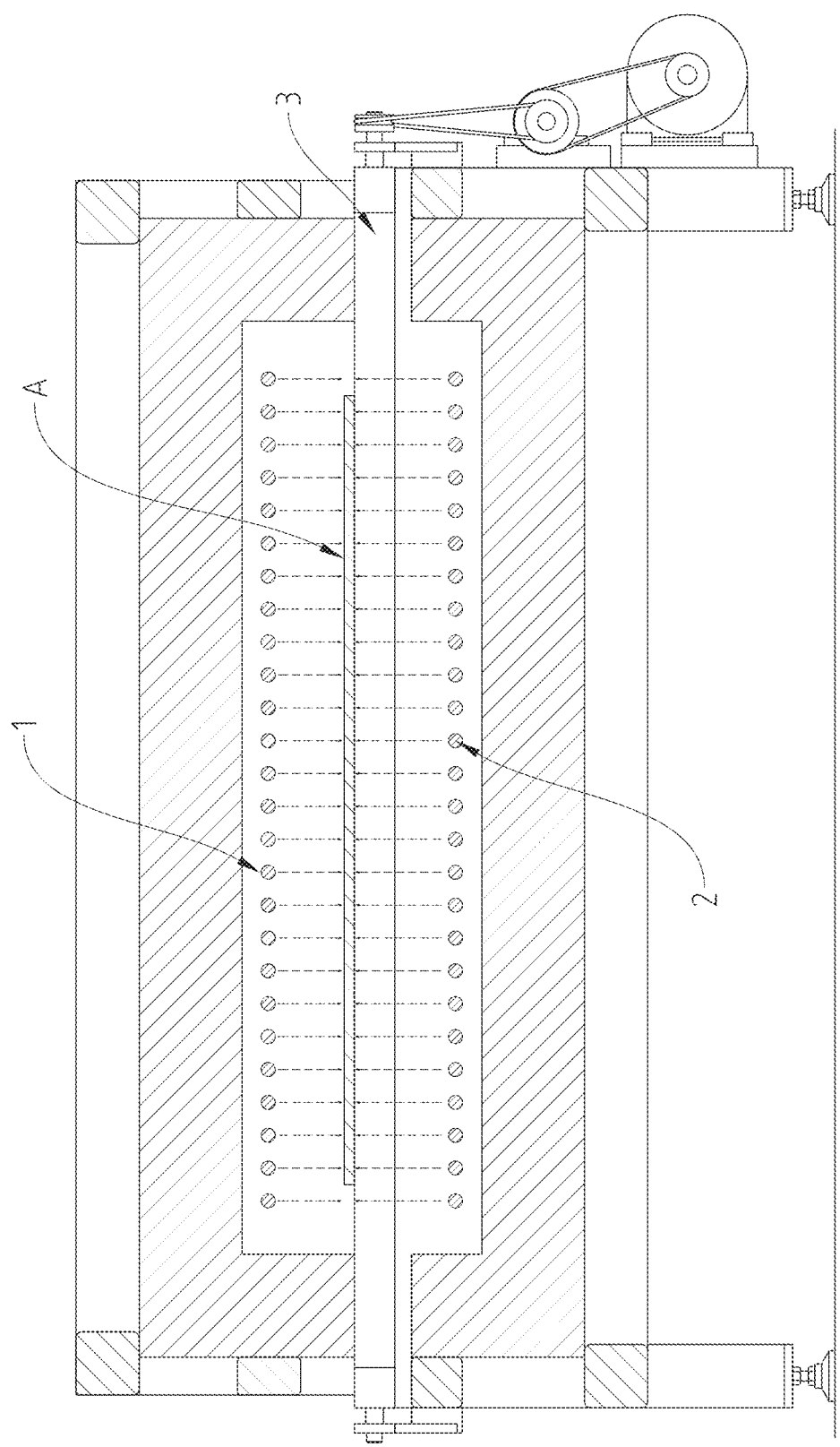
FIG. 2 shows a second schematic view of the conventional glass heating furnace.

In order to facilitate the examiner to understand the technical features, the contents and the advantages of the present disclosure, as well as the efficacy that can be reached by the present disclosure, the present disclosure will now be described in detail with the drawings and the form of expression of the embodiment. The drawings used are only for illustration and support of the specification, and hence are not necessarily accurate in scale and precise in configuration after implementation of the present disclosure. Therefore, it should not be interpreted based upon the scale and the configuration on the drawings to confine the scope of the rights claimed on the practical implementation of the present disclosure.

Referring to FIGS. 3 to 14, it shows respectively a first through twelfth schematic views, according to an embodiment of a glass heating furnace of the present disclosure. The glass healing furnace disclosed by the present disclosure comprises a furnace body 10, multiple upper heating elements 20, multiple lower heating elements 30, a roller module 40, a roller driver 50, a movable frame driver 60, a movable frame 70 and a slide rail assembly 80.

The furnace body 10 includes a rack 12, an interior of the rack 12 is surrounded by a heat insulation layer 13, and a chamber 11 is formed in the heat insulation layer 13.

The plural upper heating elements 20 are disposed in the chamber 11, and each upper heating element 20 includes a ceramic tube 21 and a fixed base 22. The ceramic tube 21 is connected with the fixed base 22, and the fixed base 22 can be connected with and fixed on the rack 12 by screws or welding. Preferably, as shown in FIG. 4, the upper heating elements 20 are disposed in intervals, and the center 20C of one upper heating element 20 is separated with the center 20C of a neighboring upper heating element 20 by a first distance B1 of 5~13 cm.

The lower heating elements 30 are disposed in the chamber 11 and are located oppositely below the upper heating elements 20. Each lower heating element 30 includes another ceramic tube 31 and another fixed base. The ceramic tube 31 is connected with the fixed base, and the fixed base is connected with and fixed on the rack 12 by screws or welding. Preferably, as shown in FIG. 4, the lower heating elements 30 are disposed in intervals, and the center 30C of one lower heating element 30 is separated with the center 30C of a neighboring lower heating element 30 by a second distance B2 of 5~13 cm.

Figure 3:
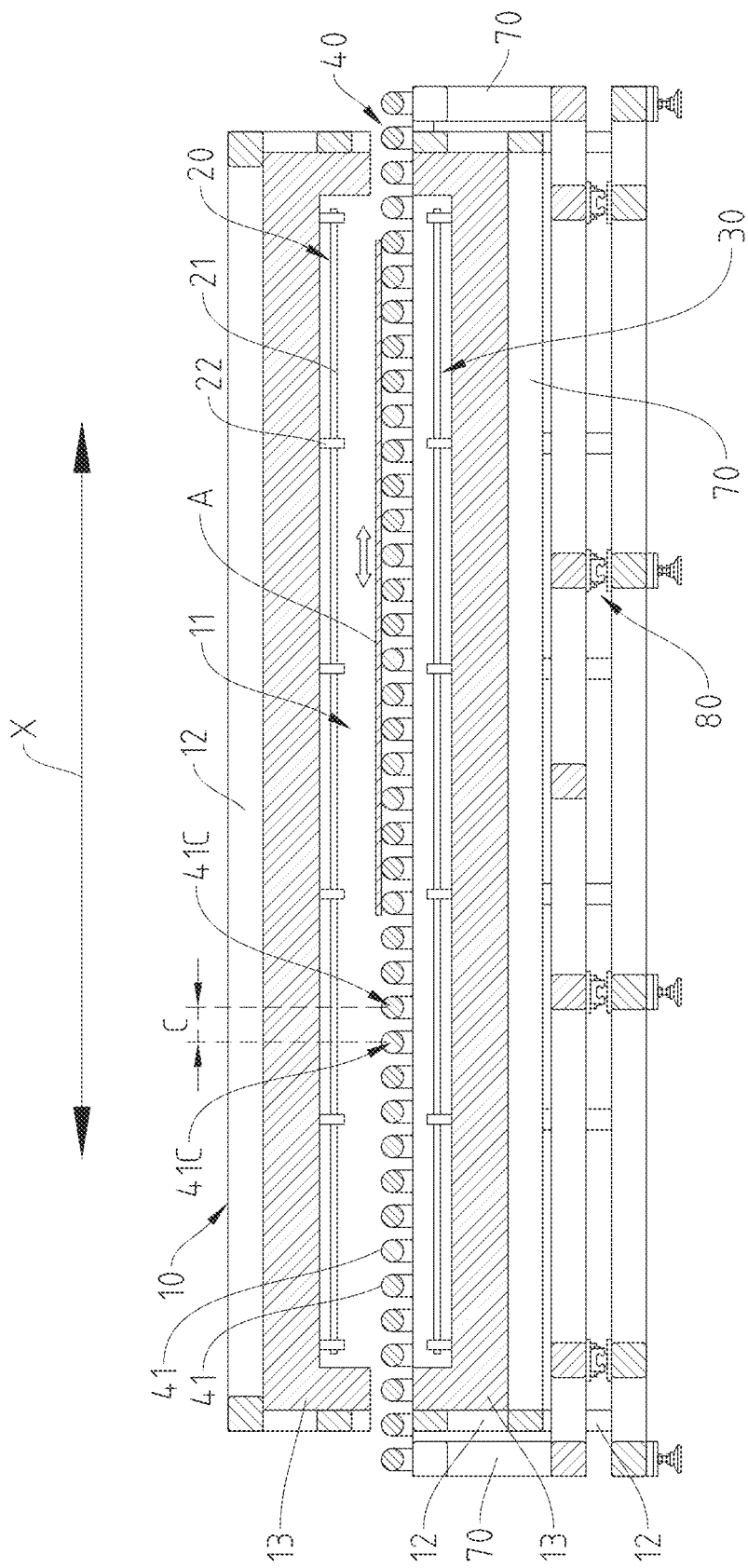
FIG. 3 shows a first schematic view of an embodiment of the glass heating furnace, according to the present disclosure.

The roller module 40 comprises multiple rollers 41 disposed in intervals in the chamber 11 along a transversal axis X and are located between the upper heating elements 20 and the lower heating elements 30. The transversal axis X is perpendicular to the direction of the axis 41A of the roller 41 (i.e. the axial direction of the roller 41), and as shown in FIG. 3, the center 41C of one roller 41 is separated with the center 41C of a neighboring roller 41 by a preferred third distance C of 8~20 cm. The rollers 41 can be, but not limited to be, parallel or perpendicular to the upper heating elements 20 or the lower heating elements 30. In the present embodiment, the rollers 41 are designed to be perpendicular to the upper heating elements 20 and the lower heating elements 30. These rollers 41 can be used to carry glass A to be heated up. As shown in FIG. 3 and FIG. 4, the rollers 41 are pivotally connected to the movable frame 70, and disposed between an upper part and a lower part of the rack 12. The movable frame 70 is slidably connected to the lower part of the rack 12 via the slide rail assembly 80.

Figure 4:
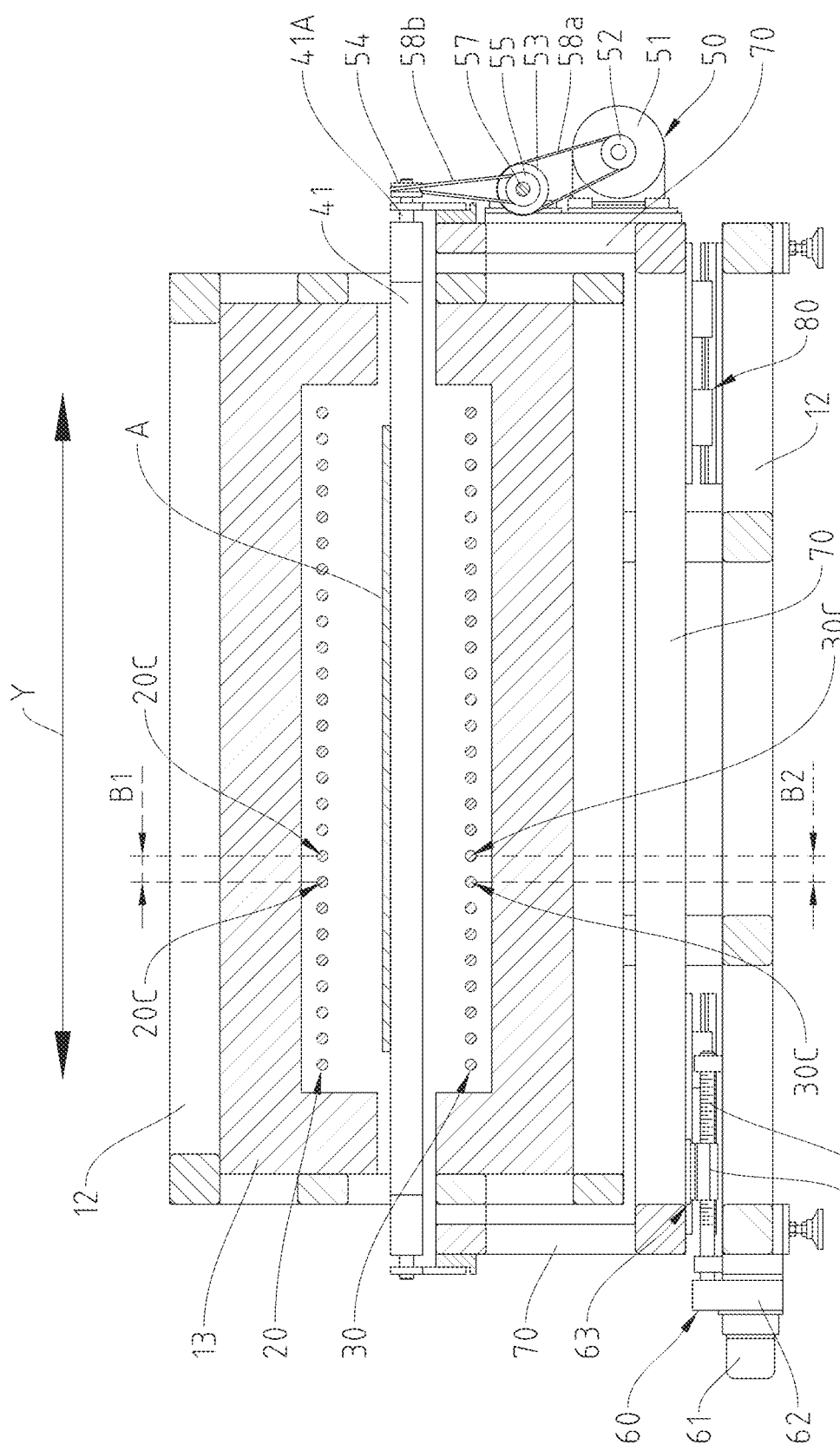
FIG. 4 shows a second schematic view of an embodiment of the glass heating furnace, according to the present disclosure.

As shown in FIG. 4, the roller driver 50 is disposed outside the furnace body 10 and is connected with the rollers 41, the rollers 41 are controlled by the roller driver 50 to rotate clockwise and counterclockwise to the transversal axis X, such that the glass A is driven to displace reciprocatively along the transversal axis X. In addition, the movable frame driver 60 is also disposed outside the furnace body 10 (but, the present disclosure is not limited thereto), and can drive the slide rail assembly 80 to make the movable frame 70 displace reciprocatively along a longitudinal axis Y, such that the rollers 41 connected to the movable frame 70 simultaneously displace reciprocatively along the longitudinal axis Y, and the displacements of the rollers 41 along the longitudinal axis Y are identical to each other. In respect to the rollers 41, the glass A has no displacement along the longitudinal axis Y, such that the friction of moving the glass A can be reduced, and the glass A still has the displacement along the longitudinal axis Y in respect to the upper heating elements 20 and the lower heating elements 30. Therefore, the uniform heating objective can be achieved, and the formation of the thermal stress marks on the glass A can be reduced effectively. Moreover, refer to FIG. 10 and FIG. 11, the movable frame 70 and the rollers 41 displace reciprocatively along the longitudinal axis Y, and the rack 12 does not displace, but stands on a ground.

Figure 10:
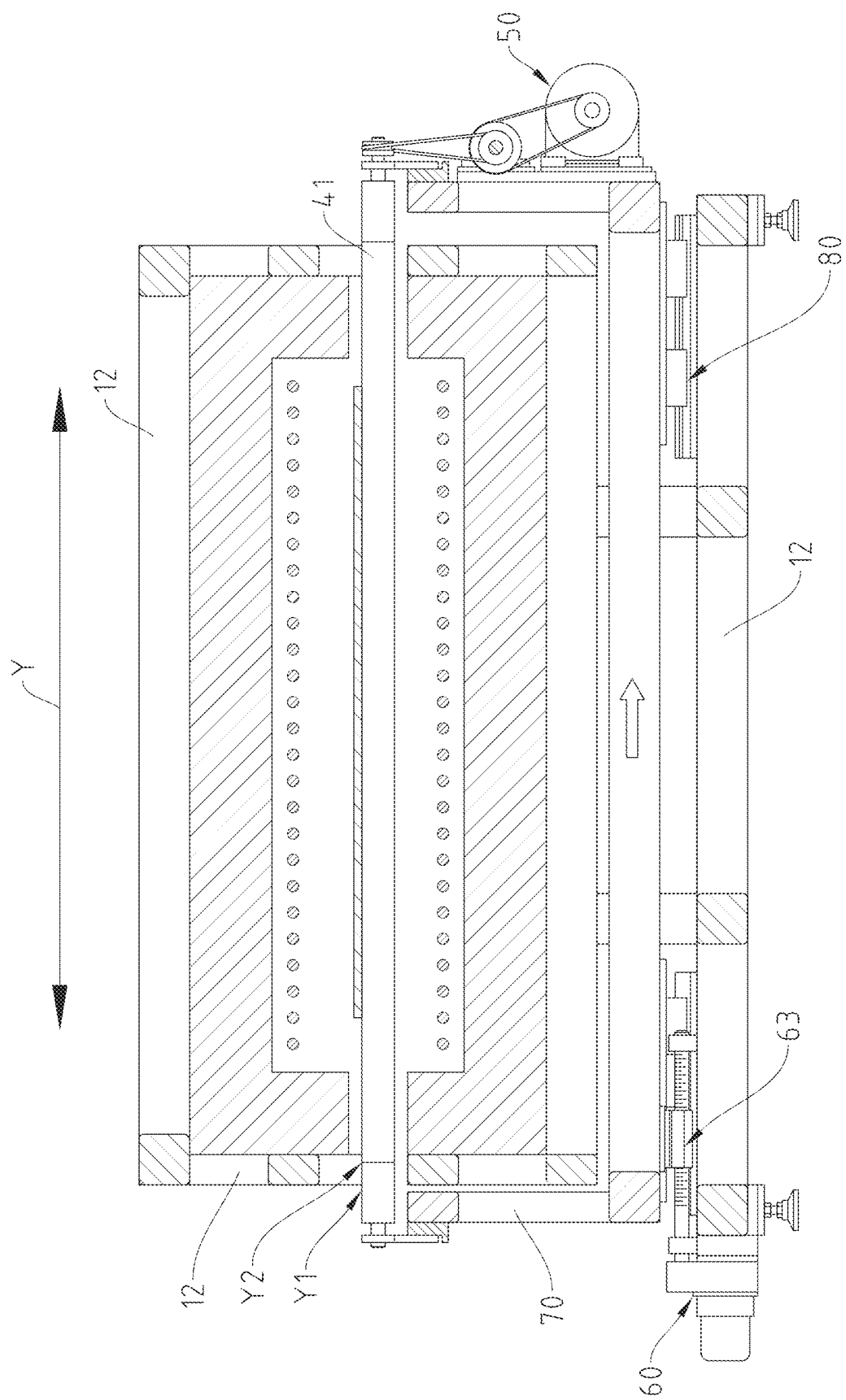
FIG. 10 shows an eighth schematic view of an embodiment of the glass heating furnace, according to the present disclosure.
Figure 11:
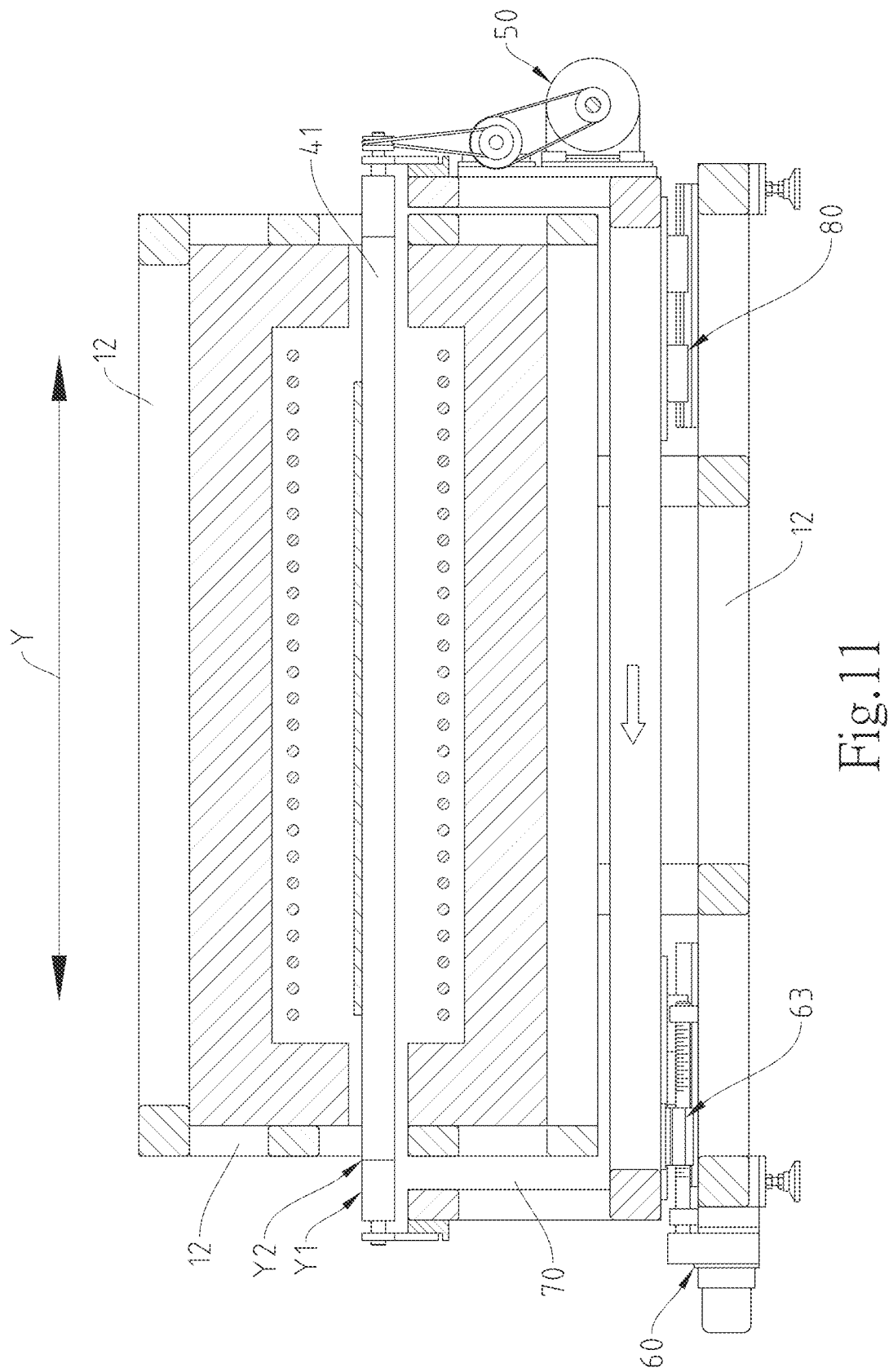
FIG. 11 shows a ninth schematic view of an embodiment of the glass heating furnace, according to the present disclosure.

Simply speaking, the rollers 41 are controlled by the movable frame driver 60 to make each of the rollers 41 reciprocatively along the longitudinal axis Y in respect to the rack 12 between two positions Y1 and Y2 (see FIG. 10 and FIG. 11). The longitudinal axis Y is parallel to the direction of the axis 41A of the roller 41 and perpendicular to the transversal axis X, meaning that the movable frame driver 60 and the rollers 41 drive the glass A carried by the rollers 41 to displace reciprocatively along the longitudinal axis Y.

Figure 5:
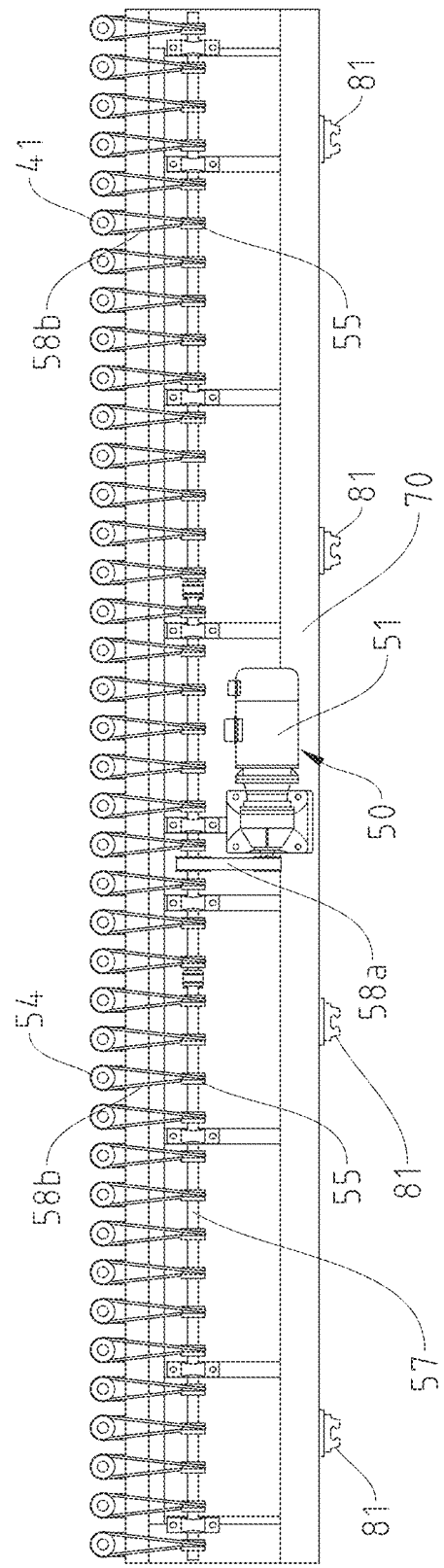
FIG. 5 shows a third schematic view of an embodiment of the glass heating furnace, according to the present disclosure.
Figure 7:
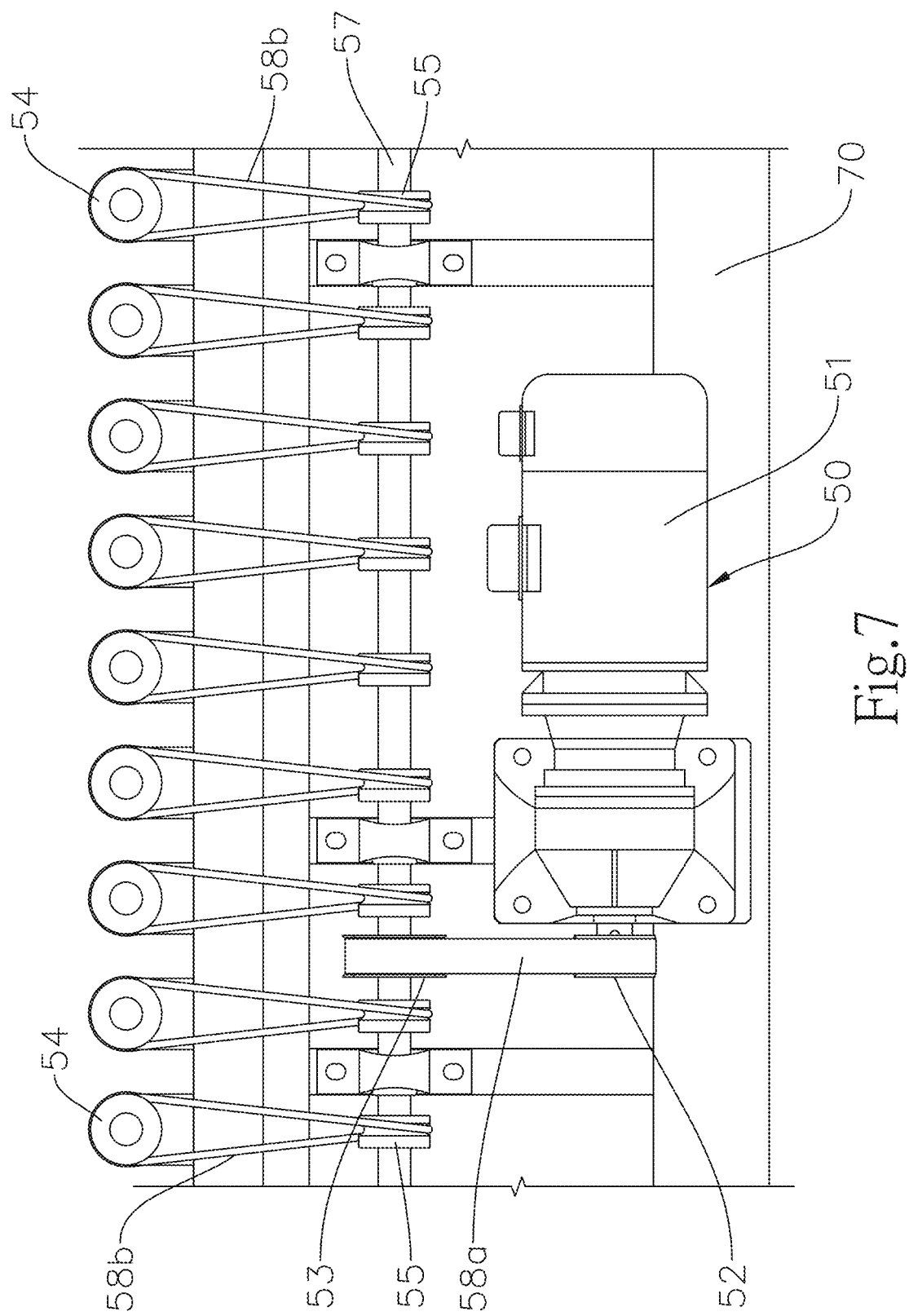
FIG. 7 shows a fifth schematic view of an embodiment of the glass heating furnace, according to the present disclosure.

As shown in FIG. 4. FIG. 5 and FIG. 7, the roller driver 50 comprises a first motor 51, a driving wheel 52, a transmission wheel 53, multiple driven wheels 54, elastic wheels 55 (such as, wheels made of PU Polyurethane material), an axial rod 57 and multiple transmission belts 58a, 58b. The first motor 51 can rotate clockwise and counterclockwise (for example, a bi-directional motor), and is connected to the driving wheel 52, and the transmission wheel 53 and the transmission belt 58a are connected to the driving wheel 52. Each of the driven wheels 54 is connected to an end of the axis 41A of the corresponding roller 41 (while another one end of the axis 41A of the roller 41 is pivotally connected to movable frame 70). The transmission wheel 53 and the elastic wheels 55 are penetrated by and pivotally connected to the axial rod 57, and the driven wheels 54 are respectively connected to the elastic wheels 55 via the transmission belts 58b. The first motor 51 can drive the driving wheel 52 to rotate clockwise and counterclockwise, thus the driving wheel 52 drives the transmission wheel 53 to rotate clockwise and counterclockwise via the transmission belt 58a, and the axial rod 57 is driven to rotate as well as the elastic wheels 55. Next, the elastic wheels 55 drive the driven wheels 54 via the transmission belt 58b, such that the rollers 41 can rotate clockwise and counterclockwise, and the glass A carried on the rollers 41 can reciprocatively displace along the transversal axis X. Each roller 40 can be designed as a barrel and can be made of glass, ceramic or quartz.

Figure 6:
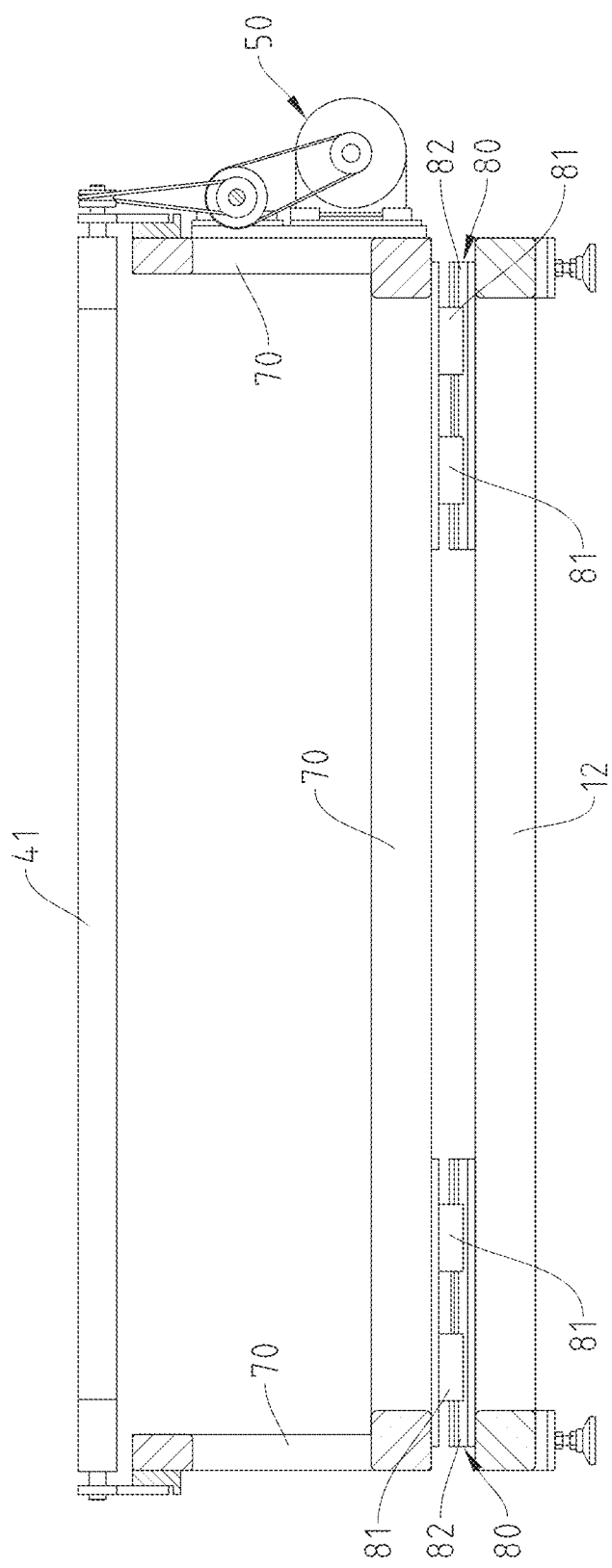
FIG. 6 shows a fourth schematic view of an embodiment of the glass heating furnace, according to the present disclosure.
Figure 8:
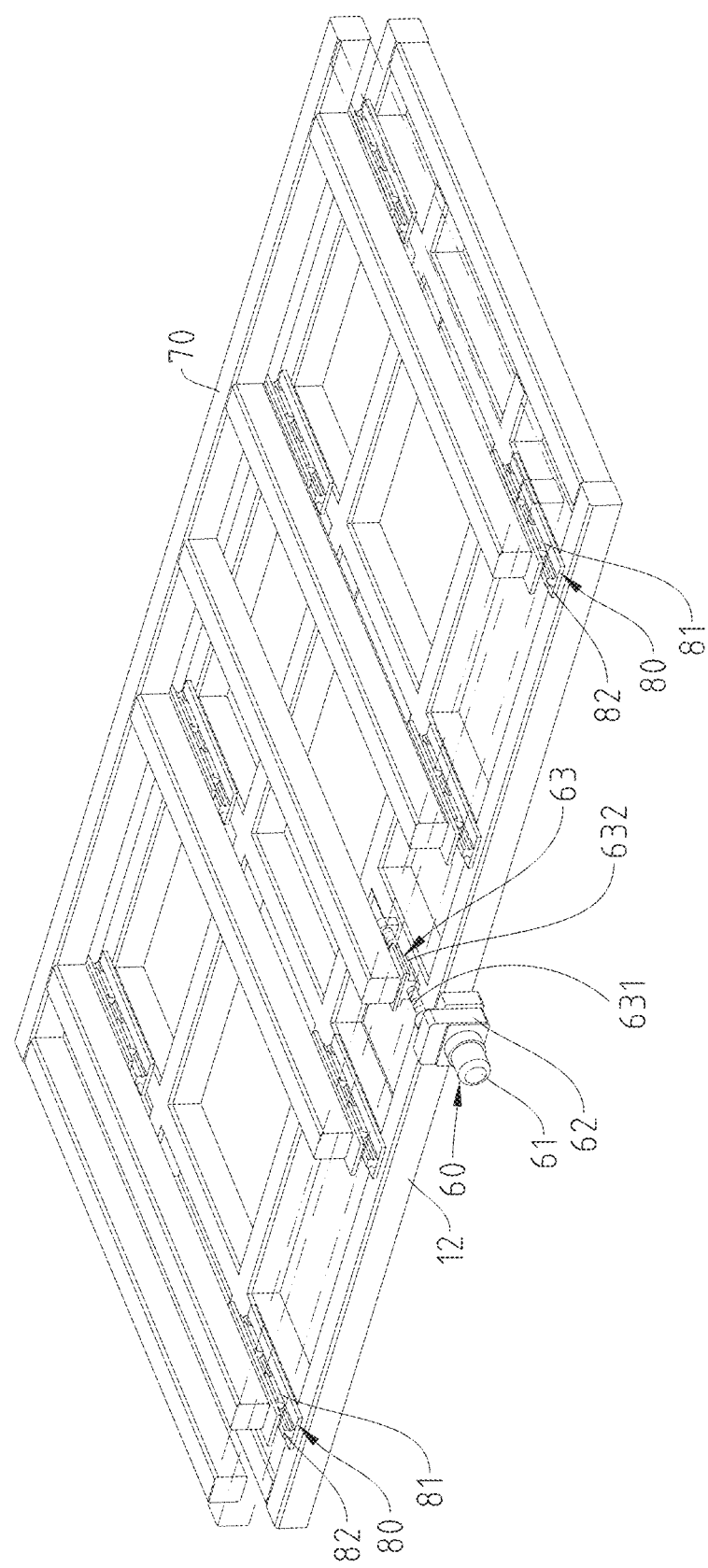
FIG. 8 shows a sixth schematic view of an embodiment of the glass heating furnace, according to the present disclosure.

Refer to FIG. 4. FIG. 6 and FIG. 8, the movable frame 70 is slidably connected to the lower part of the rack 12 via at least one slide rail assembly 80, and preferably, the more slide rail assemblies 80 are used. The slide rail assembly 80 comprises a slide block 81 and a slide rail 82, one of the slide block 81 and the slide rail 82 is connected to a bottom edge of the movable frame while the other one of the of the slide block 81 and the slide rail 82 is connected to a portion of the rack 12. The slide block 81 and the slide rail 82 are disposed corresponding to each other, such that the movable frame 70 can displace in respect to the rack 12.

Figure 9:
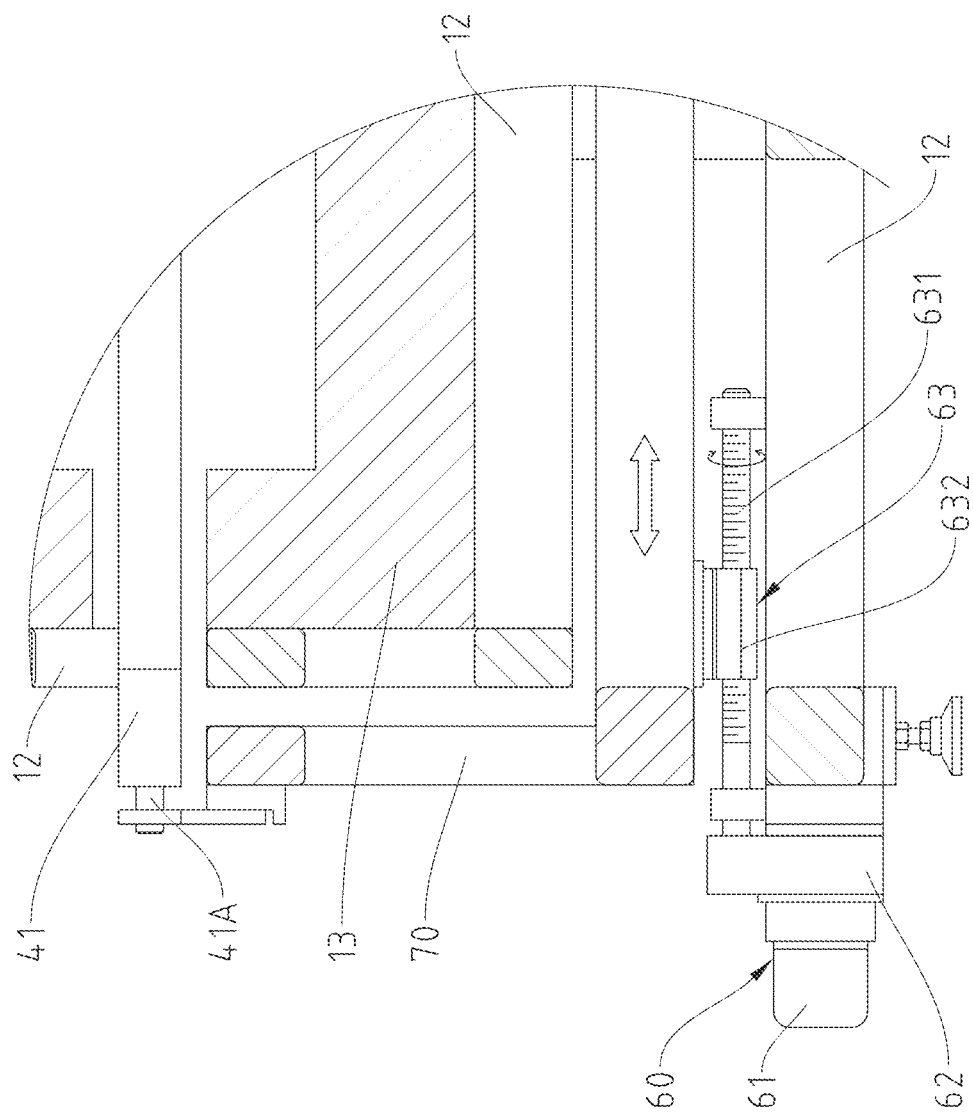
FIG. 9 shows a seventh schematic view of an embodiment of the glass heating furnace, according to the present disclosure.

Refer to FIG. 4, FIG. 6 and FIG. 9, the movable frame driver 60 at lest comprises a second motor 61, a decelerator 62 and a threaded rod assembly 63. The second motor 61 can rotate clockwise and counterclockwise (for example, a bi-directional motor), the decelerator 62 can reduce the rotating speed and increase the torque, and the threaded rod assembly 63 are connected to the movable frame 70 and the decelerator 62, and the decelerator 62 is connected to the second motor 61, thereby the movable frame driver 60 drives the movable frame 70 displaces along the longitudinal axis Y. The movable frame driver 60 is used to push the movable frame 70 to displace reciprocatively along the longitudinal axis Y, thereby driving the rollers 41 which are connected with the moving frame 70 to displace reciprocatively along the longitudinal axis Y and enabling the glass A which is carried by the rollers 41 to displace reciprocatively along the longitudinal axis Y.

In the present embodiment, the threaded rod assembly 63 comprises a threaded rod 631 and a threaded block 632, the threaded rod 631 and the threaded block 632 can be gnawed with each other, and the direction of the axis of the threaded rod 631 is parallel to the longitudinal axis Y The gear of the decelerator 62 (not shown in the drawings) is pivotally connected to the second motor 61, and the threaded rod 631 and the gear of the decelerator 62 can be gnawed with each other.

In the embodiment wherein the threaded block 632 is fixed with the movable frame 70, the second motor 61 that can rotate clockwise and counterclockwise and the decelerator 62 that can reduce the rotating speed and increase the torque are disposed on one side of the rack 12, and used to drive the threaded rod 631 to rotate. As the threaded block 632 is fixed with the movable frame 70, the threaded block 632 cannot move in respect to the movable frame 70, which forces the threaded block 632 to displace reciprocatively following the clockwise rotation and the counterclockwise rotation of the second motor 61, causing the movable frame 70 to displace reciprocatively along the longitudinal axis Y, and further causing the rollers 41 that are connected with the movable frame 70 to displace reciprocatively along the longitudinal axis Y Therefore, the glass A that is carried by the rollers 41 can displace reciprocatively along the longitudinal axis Y.

In the embodiment that the threaded rod 631 is fixed with the movable frame 70, the gear of the decelerator 62 (not shown in the drawings' is pivotally connected to the second motor 61, the threaded rod 631 and the gear of the decelerator 62 are gnawed with each other, and the second motor 61 that can rotate clockwise and counterclockwise and the decelerator 62 that can reduce the rotating speed and increase the torque are disposed on one side of the rack 12, and used to drive the threaded block 632 to rotate. As the threaded rod 631 is fixed with the movable frame 70, the threaded rod 631 cannot move in respect to the movable frame 70, which forces the threaded rod 631 to displace reciprocatively following the clockwise rotation and the counterclockwise rotation of the second motor 61, causing the movable frame 70 and the rollers 41 connected to the movable frame 70 to displace reciprocatively along the longitudinal axis Y. Therefore, the glass A that is carried by the rollers 41 can displace reciprocatively along the longitudinal axis Y.

The abovementioned rollers 41 can displace reciprocatively between the two positions Y1, Y2 along the longitudinal axis Y under the control of the movable frame driver 60. In the present embodiment, the rollers 41 are perpendicular to the upper heating elements 20 and the lower heating elements 30, and the distance between the two positions is at least one fourth of the first distance 91 or at least one fourth of the second distance B2 Preferably, the distance between the two positions is at least one third of the first distance 131 or at least one third of the second distance B2. It is even better that the distance between the two positions is at least one half of the first distance B1 or at least one half of the second distance B2. Moreover, it is best that the distance between the two positions is not smaller than the first distance 91 or not smaller than the second distance B2.

Figure 12:
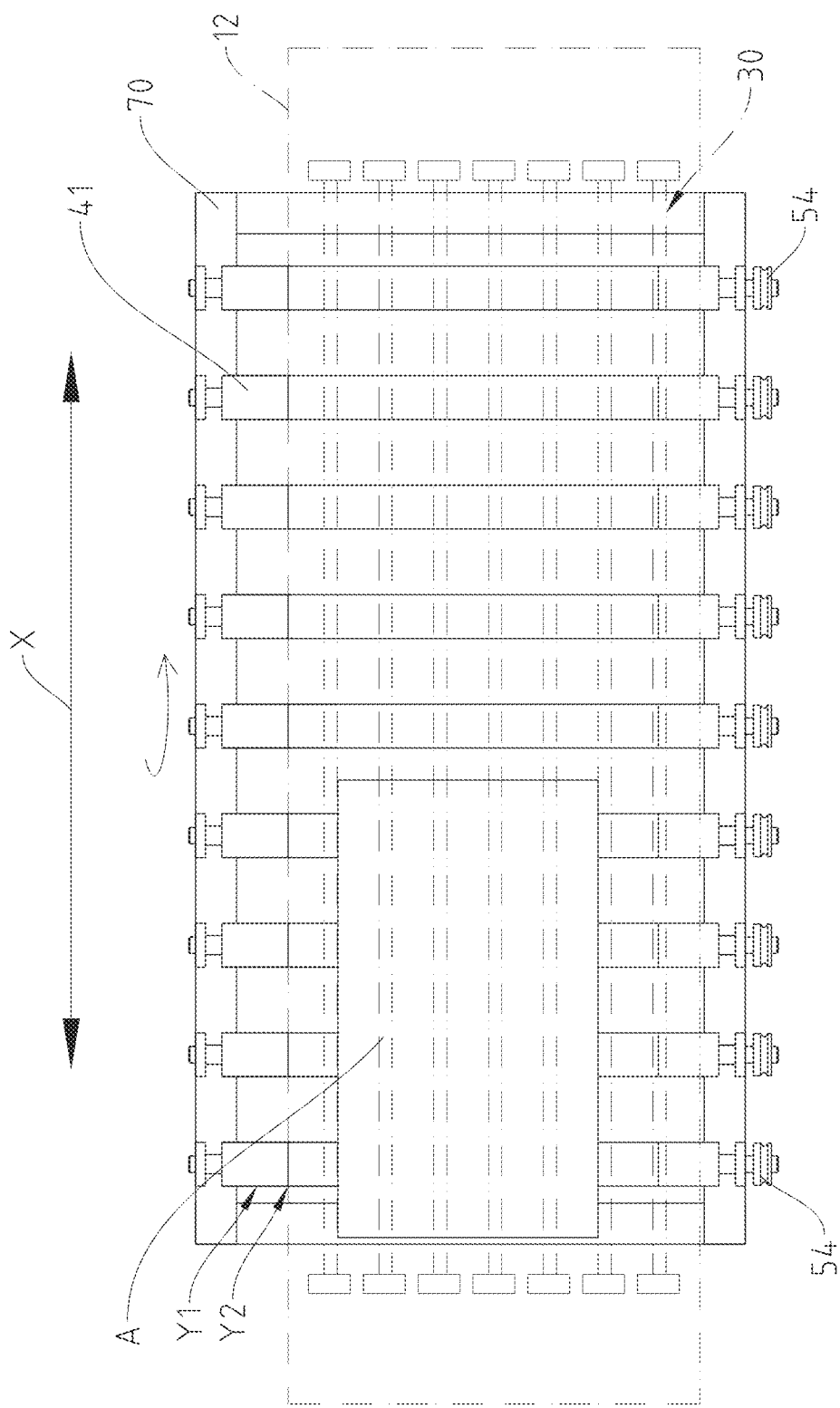
FIG. 12 shows a tenth schematic view of an embodiment of the glass heating furnace, according to the present disclosure.
Figure 13:
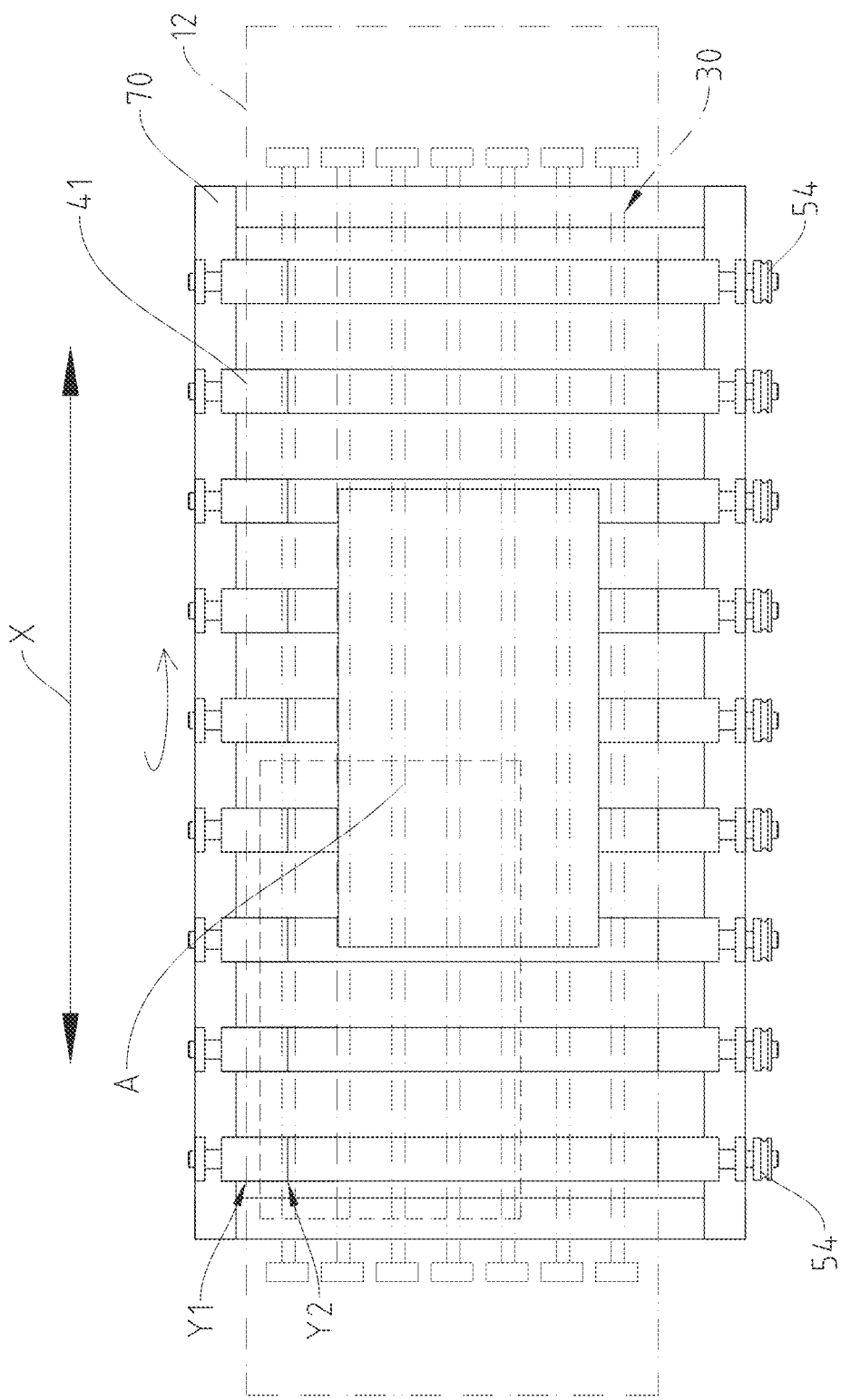
FIG. 13 shows an eleventh schematic view of an embodiment of the glass heating furnace, according to the present disclosure.
Figure 14:
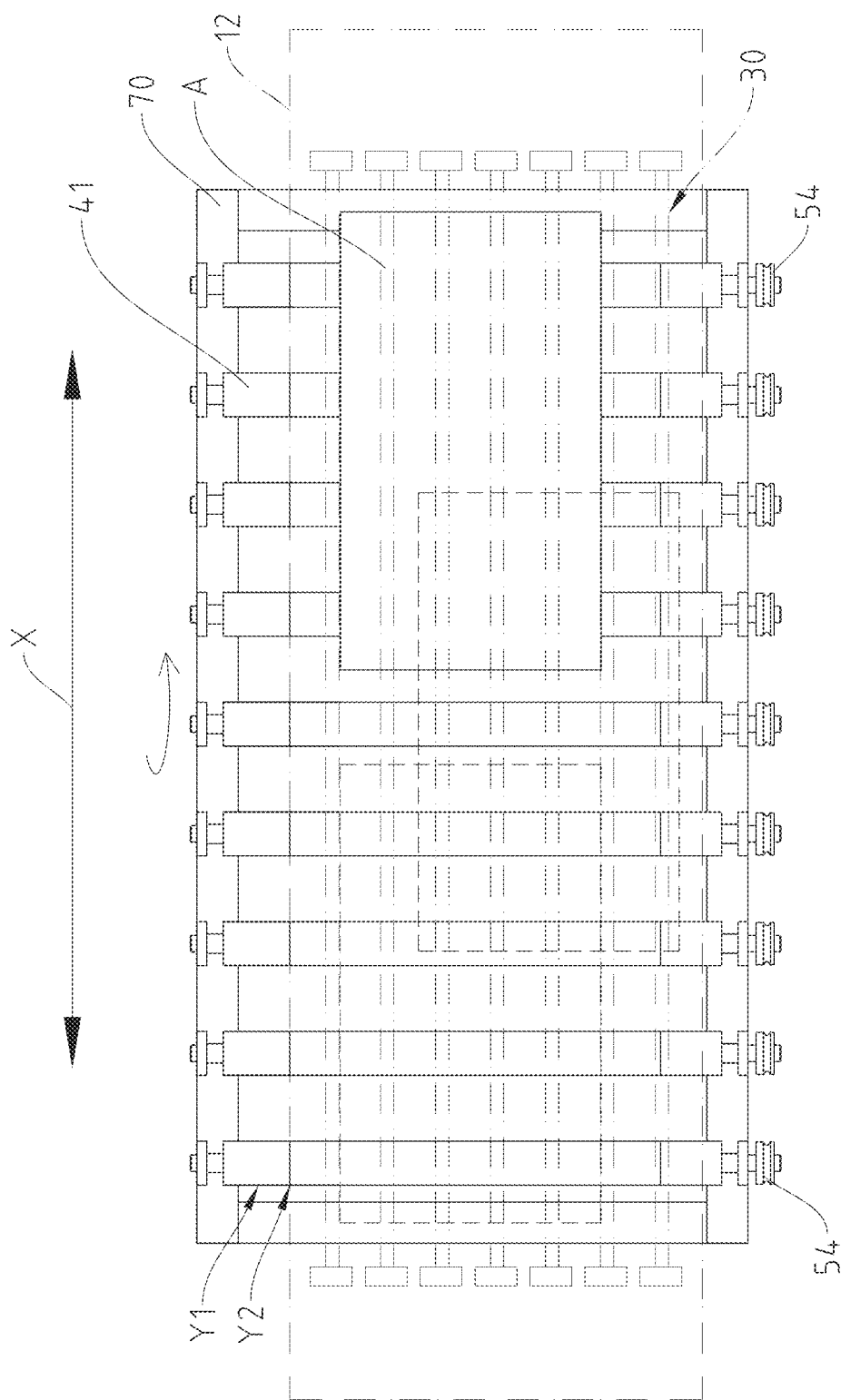
FIG. 14 shows a twelfth schematic view of an embodiment of the glass heating furnace, according to the present disclosure.

Refer to FIG. 12 through FIG. 14, when glass A is transmitted in a single direction for processing toward the outlet of the chamber 11 along the transversal axis X from the inlet of the chamber 11 by the rollers 41, as the movable frame driver 60 drives the glass A to displace reciprocatively along the longitudinal axis Y, the glass A will displace along an S-shaped moving path in respect to the upper heating elements 20 and the lower heating elements 30. This means that the moving path of the glass A in the chamber 11 in respect to the upper heating elements 20 and the lower heating elements 30 is like an English letter of S, thereby allowing the glass A to be heated up uniformly, which reduces effectively the formation of the thermal stress marks on the glass A. By the way, the roller driver 50 can be disposed on the side of the movable frame 70, and thus the roller driver 50 and the rollers 41 connected to the movable frame 70 displace along the longitudinal axis Y at the same time, and the displacements of the roller driver 50 and the rollers 41 along the longitudinal axis Y are identical to each other.

To sum up, the roller driver is utilized to control the rollers to rotate to make the glass displace along the transversal axis reciprocatively, and the movable frame driver is utilized to control the slide rail assembly to drive the movable frame to displace reciprocatively along the longitudinal axis, such that the rollers connected to the movable frame are driven to displace reciprocatively along the longitudinal axis, and the glass conveyed by the rollers can displace reciprocatively along the longitudinal axis. Therefore, the reciprocative displacement can be adjusted and modified to increase an area of the glass which is heated up uniformly. Compared to the prior art which utilizes multiple motors to control the rollers asynchronously to displace reciprocatively along the longitudinal axis, the present disclosure uses merely one motor to control the rollers synchronously (i.e. at the same time) to displace reciprocatively along the longitudinal axis, thereby reducing the friction of moving the glass. Accordingly, compared to the prior art, the control mechanism of the glass heating furnace of the present disclosure is more simple, the manufacturing cost of the glass heating furnace of the present disclosure is cheaper, and the glass heating furnace of the present disclosure enables the glass A to be heated up more uniformly and reduces the formation of the thermal stress marks on the glass A It is of course to be understood that the embodiments described herein is merely illustrative of the principles of the disclosure and that a wide variety of modifications thereto may be effected by persons skilled in the art without departing from the spirit and scope of the disclosure as set forth in the following claims.

What is claimed is:

1. A glass heating furnace comprising:
    a furnace body comprising a rack and a chamber, wherein an interior of an upper portion of the rack is formed with the chamber;

a plurality of upper heating elements disposed in the chamber with a center of each upper heating element being separated from a center of a neighboring upper heating element by a first distance, wherein the upper heating elements are used to heat a glass in the chamber;

a plurality of lower heating elements disposed in the chamber and located oppositely below the upper heating elements, with a center of each lower heating element being separated from a center of a neighboring lower heating element by a second distance, wherein the lower heating elements are used to heat the glass in the chamber;

a plurality of rollers disposed in the chamber along a transversal axis and separated from each other and located between the upper heating elements and the lower heating elements, with the transversal axis being perpendicular to a longitudinal axis and that longitudinal axis being parallel to axes of the rollers;

a roller driver disposed outside the furnace body, connected to the rollers, and used to control the rollers to rotate;

a movable frame slidably connected to a lower portion of the rack of the furnace body and wherein the rollers are connected to the movable frame; and a movable frame driver disposed on the furnace body, wherein the movable frame driver controls the movable frame to move reciprocatively along the longitudinal axis with respect to the lower portion of the rack, and wherein all of the rollers are driven to simultaneously move reciprocatively along the longitudinal axis, wherein amounts of movement of each of the rollers along the longitudinal axis are identical to each other.

2. The glass heating furnace according to claim 1, further comprising: a slide rail assembly, comprising a slide block and a slide rail, such that the movable frame is slidably connected to a lower part of the rack and disposed on the rack.

3. The glass heating furnace according to claim 1, wherein the movable frame moves reciprocatively only along the longitudinal axis between two positions, and a distance between the two positions is at least one fourth of the first distance or at least one fourth of the second distance.

4. The glass heating furnace according to claim 1, wherein the movable frame moves reciprocatively only the longitudinal axis between two positions, and a distance between the two positions is at least one third of the first distance or at least one third of the second distance.

5. The glass heating furnace according to claim 1, wherein the movable frame moves reciprocatively only along the longitudinal axis between two positions, and a distance between the two positions is at least one half of the first distance or at least one third of the second distance.

6. The glass heating furnace according to claim 1, wherein the movable frame moves reciprocatively only along the longitudinal axis between two positions, and a distance between the two positions is not smaller than the first distance or not smaller than the second distance.

7. The glass heating furnace according to claim 1, wherein the roller driver comprises a first motor, a driving wheel, a transmission wheel, a plurality of driven wheels, a plurality of elastic wheels, an axial rod and a plurality of transmission belts, wherein the first motor is a bi-directional motor capable of rotating clockwise and counterclockwise, and is connected to the driving wheel, the transmission wheel and one of the transmission belts are connected to the driving wheel, each of the driven wheels is connected to an end of the axis of the corresponding one of the rollers, the transmission wheel and the elastic wheels are penetrated by and connected to the axial rod, and the driven wheels are respectively connected to the elastic wheels via the other transmission belts.

8. The glass heating furnace according to claim 1, wherein the movable frame driver comprises a second motor, a decelerator and a threaded rod assembly, wherein the second motor is a bi-directional motor capable of rotating clockwise and counterclockwise, the decelerator is capable of reducing a rotating speed and increases a torque, the threaded rod assembly is connected to the movable frame and the decelerator, and the decelerator is connected to the second motor, thereby the movable frame driver drives the movable frame along the longitudinal axis.

9. The glass heating furnace according to claim 8, wherein the threaded rod assembly comprises a threaded rod and a threaded block, the threaded rod and the threaded block are engaged to each other, and an axis of the threaded rod is parallel to the longitudinal axis.

10. The glass heating furnace according to claim 9, wherein the threaded rod is fixed with the movable frame.

11. The glass heating furnace according to claim 9, wherein the threaded block is fixed with the movable frame.

12. The glass heating furnace according to claim 1, wherein the rack does not displace, and the movable frame moves along the longitudinal axis relative to the rack.

* * * * *